United States Patent
Pritchard

(10) Patent No.: US 7,536,943 B2
(45) Date of Patent: May 26, 2009

(54) VALVE AND AUXILIARY EXHAUST SYSTEM FOR HIGH EFFICIENCY STEAM ENGINES AND COMPRESSED GAS MOTORS

(76) Inventor: Edward Pritchard, 6 Cone Close, Ringwood, Melbourne, Victoria (AU)

(*) Notice: Subject to any disclaimer, the term of this patent is extended or adjusted under 35 U.S.C. 154(b) by 89 days.

(21) Appl. No.: 11/350,381

(22) Filed: Feb. 6, 2006

(65) Prior Publication Data

US 2006/0174613 A1  Aug. 10, 2006

Related U.S. Application Data

(60) Provisional application No. 60/651,693, filed on Feb. 9, 2005.

(51) Int. Cl.
*F01L 31/00* (2006.01)

(52) U.S. Cl. .......................... 91/243; 91/350

(58) Field of Classification Search ............... 91/243, 91/350, 351
See application file for complete search history.

(56) References Cited

U.S. PATENT DOCUMENTS

| | | | |
|---|---|---|---|
| 152,541 A | 6/1874 | Winchester | |
| 661,061 A | 11/1900 | Lidback | |
| 935,169 A * | 9/1909 | Smartt | 91/350 |
| 1,076,256 A * | 10/1913 | Williams | 91/243 |
| 1,409,309 A | 3/1922 | Nordberg | |
| 1,924,689 A | 8/1933 | Knight | |
| 2,688,955 A | 9/1954 | Ricardo | |
| 3,552,370 A | 1/1971 | Briggs | |
| 3,651,641 A | 3/1972 | Ginter | |
| 3,769,788 A | 11/1973 | Korper | |
| 3,788,193 A | 1/1974 | O'Connor | |
| 3,959,974 A | 6/1976 | Thomas | |
| 3,967,535 A | 7/1976 | Rozansky | |
| 3,991,574 A | 11/1976 | Frazier | |
| 4,425,763 A | 1/1984 | Porta | |
| 6,543,215 B2 | 4/2003 | Langenfeld | |
| 6,863,508 B2 | 3/2005 | Hauser | |

FOREIGN PATENT DOCUMENTS

| | | |
|---|---|---|
| CH | 73015 | 8/1916 |
| DE | 237 263 | 9/1909 |
| DE | 489034 | 1/1930 |
| DE | 648642 | 8/1937 |

* cited by examiner

*Primary Examiner*—F. Daniel Lopez
(74) *Attorney, Agent, or Firm*—Donn K. Harms

(57) ABSTRACT

A steam engine with improved intake and exhaust flow provided by separate pairs of intake and exhaust ports located at both ends of a steam drive cylinder. A slide valve located adjacent to the drive cylinder provides for timed sealing of intake and exhaust ports during operation. Exhaust is facilitated by the provision of two paths of exhaust from the cylinder and the exhaust ports may be adjusted for a flow volume to meter exhaust steam flow to significantly reduce back pressure only at low speeds of said engine.

8 Claims, 3 Drawing Sheets

VALVE AND AUXILIARY EXHAUST SYSTEM FOR HIGH EFFICIENCY STEAM ENGINES AND COMPRESSED GAS MOTORS

This application claims the benefit of U.S. Provisional Patent Application No. 60/651,693, filed Feb. 9, 2005.

FIELD OF THE INVENTION

The invention relates to steam engines. More particularly, the invention herein disclosed relates to an improved design of the valve and auxiliary exhaust system for steam engines of both the double-acting and single-acting designs and in particular for uniflow steam engines with auxiliary exhaust. The design can be employed upon fixed timing engines or with added means for timing adjustment, upon variable timing steam engines.

BACKGROUND OF THE INVENTION

Single-acting and double-acting steam engines have provided power for industry and other uses for a long period of time. The single-acting steam engine may resemble a two and a four-stroke internal combustion engines in that a piston, connecting rod and crank are used per cylinder set. With the double-acting form of steam engine, straight line reciprocating motion is described not only by each piston, but also by each piston rod and crosshead. Motion is transferred from the crosshead via a connecting rod to the crank. The piston rod passes through a seal in the end of the cylinder and the steam is valved to work on the piston from above and also below it. This gives a "one stroke" action. With two double-acting cylinders, only four valves are required on a "full" uniflow engine of conventional design as against sixteen valves being required for an eight-cylinder four-stroke engine which exerts the same number of power impulses per revolution.

The uniflow engine exhaust system uses holes in the cylinder which are exposed to the top end of the cylinder adjacent to the piston near the bottom of its stroke. The same row of holes are exposed to the bottom or crank end of the cylinder adjacent to the piston near the top of its stroke. The length of the piston adjacent to the cylinder wall is equal or approximately equal to the stroke minus the diameter or length of the exhaust holes. (The exhaust holes in the cylinder can be seen in one of the photos on display). Clearance volume is provided at each end of the cylinder to allow for reasonable compression to take place at each end of a stroke.

A semi-uniflow engine is one in which exhaust valves are used to supplement the action of the exhaust holes in the cylinder wall. By employing the exhaust valves, the point at which compression begins on the return stroke of the piston can be delayed. Such an auxiliary exhaust feature is useful especially where exhaust is at atmospheric pressure rather than into a vacuum and/or, further, where compounding is utilized. Further, in single cylinder engines which are not necessarily self-starting, the auxiliary exhaust makes the engine easier to start. This is because it is easier before the admission steam starts the engine to rotate the engine against compression since with an auxiliary exhaust system compression acting against the piston begins later on the compression stroke.

In some early uniflow engines with auxiliary exhaust systems, the auxiliary or secondary exhaust steam traveled out through the same ports and passages through which previously admission steam entered. A disadvantage of this design is that the cooling effect of the exhausting steam lowered the efficiency of the engine. In other early semi-uniflow engines the auxiliary or secondary exhaust steam exhausted through special ports in the cylinder wall at positions between the main uniflow exhaust and the admission passages, the latter located near the cylinder ends.

Special valves such as poppet valves controlled these auxiliary exhaust passageways. These engines, if of the double-acting type, were fitted with four valves: two for inlet steam—one at each end of the cylinder, and two for auxiliary exhaust—one for the upper part of the cylinder and one for the lower part of the cylinder. A disadvantage of this design with its four valves plus the respective valve motions required for their operation is relative complexity. [See Skinner. P271. "Power from Steam," R. L. Hills.]

PRIOR ART

U.S. Pat. No. 3,967,535 (Rozansky) while disclosing that the device relates to uniflow steam engines having a novel valving means for controlling the introduction of steam into the cylinders, is not concerned with auxiliary exhausting.

U.S. Pat. No. 3,651,641 (Ginter) discloses an engine system and thermogenerator therefor. Ginter in teaching a valving system seems primarily concerned with an internal combustion engine with water internal cooling and there are no uniflow exhaust ports and no auxiliary exhaust ports disclosed.

U.S. Pat. No. 3,967,525 (Rosansky), while disclosing that the device relates to uniflow steam engines having a novel valving means for controlling the introduction of steam into the cylinders, is not concerned with auxiliary exhausting.

U.S. Pat. No. 3,991,574 (Frazier) discloses a uniflow exhaust system in a rather complex structure. However, Frazier does not teach the employment of an auxiliary [uniflow] exhaust.

U.S. Pat. No. 3,788,193 (O'Conner) discloses a spool type slide valve for controlling both admission and auxiliary [uniflow] exhaust. However, O'Conner requires the employment of a complex system of powered cams to operate the disclosed valve. O'Conner teaches a complex double cam driven system, the cams having positive lift and drop as in "desmodromic" systems with complex chain drives to achieve variable valve timing. In the mid-position of the slide valve it appears that the admission and auxiliary exhaust ports are both closed. The variable engine "timing" or valve events are controlled by phase changes in their relative positions of the double cams and also with the angular displacements of the camshafts with the "variable" chain drive.

As such, there exists a need for an improved auxiliary exhaust valving system on steam engines with fixed timing which employs a simple mechanical operation to achieve the desired result. Such a device should utilize simple harmonic motion from a simple eccentric and should provide the required valve events by careful selection or design of the required bobbin admission and exhaust "laps" or the eccentric radius and also the phase relationship between the eccentric valve drive and the crank. Still further, such a device and system should be easily adaptable to a variable timing steam engines.

With this design, the valve events can be worked out using conventional valve diagrams, e.g. "*Bilgrams Valve Diagram*". Still further, such a design should control the auxiliary exhaust in a manner similar to the conventional steam engine which exhausts through the common admission/exhaust ports. Employing such a control, the auxiliary exhaust should then be communicated through ports and passages separate from the admission passages which could be said to be in the correct uniflow tradition. Main central uniflow exhaust should also be utilized.

As can be seen and readily discerned by those skilled in the art, this invention can also be employed, if desired, to obtain variable valve timing using conventional valve gears such as Stephenson's link, Allan's link motion, Joy valve gear, Walschaert, etc. This enables forward and reverse operation plus changes of cut-off.

SUMMARY OF THE INVENTION

The disclosed device provides for an improved valve and auxiliary exhaust system when employed and yields a high efficiency steam engine or compressed gas motor. For fixed timing, as may be utilized for a stationary engine, a preferred embodiment utilizes movement for the slide valve in harmonic motion derived from a simple eccentric and connecting rod and obtains the required valve events by careful selection or design and inter-related functions of the required bobbin admission, and auxiliary exhaust "laps," and the eccentric radius and the phase relationship between the eccentric and the crank. The slide valve would be adapted to move in a direction controlled by an eccentric set at between 90 to 180 degrees ahead of the crank controlling the piston. The design procedure for valve event timing is similar to that of a conventional non-uniflow outside-admission slide valve or other slide valve engine. Conventional valve diagrams such as Reuleaux's Slide Valve diagram can be used to assist in the design of this invention.

It should be noted that the device as herein disclosed shows employment for use in combination with a fixed timing engine for ease of illustration of the novel properties of the device and the great utility provided in steam or compressed air engines. However, those skilled in the art will no doubt realize that inclusion of a means to vary engine timing, such as a camshaft, could be added to the design disclosed herein, thereby providing a variable timing engine with improved efficiency, and all such modifications are anticipated to be within the scope of this invention.

The embodiments herein provide for forward and reverse control and change of cut-off to facilitate start-ups and obtain normal operation at more efficient early cut-offs as is usually required for a mobile engine. Again, conventional slide valve driving mechanisms such as Stephenson's Link Motion and Walschaert's Valve Gear can be utilized to drive the valves of this invention.

The embodiment further provides for built-in easy starting with low compression plus phasing out auxiliary exhaust under more load and speed. This is achieved with the area of the auxiliary exhaust ports designed so that, on start-up and at slow speeds, the steam flow is adequate to hold cylinder exhaust pressure close to exhaust pipe discharge pressure. This assists with easy starting of the engine and makes for smooth running at low speeds. However, with rising speeds and bigger throttle openings, more steam will pass through the engine. There will consequently be greater pressure drop through the auxiliary exhaust ports with the amount of pressure drop depending on the flow areas. The latter are designed to achieve the desired metering of the steam flows. This will lead to higher cylinder pressures and higher compression pressures, i.e., the engine will run more like a "full uniflow" type and higher efficiency can be realized.

The above design provides a device which is much simpler than alternative systems of controlling the extent and timing of opening of the auxiliary exhaust ports. This latter more complicated type of arrangement may be activated by devices sensitive to engine speed and/or amount of steam flowing through the engine.

The valve functions for controlling inlet steam and auxiliary exhaust steam are provided by a slide valve, preferably of the slide valve type. Slide valve designs were commonly used in conventional types of counter-flow steam engines, but in the device and method herein disclosed, the valve is used in a different manner in keeping with the uniflow principle. In keeping with that principle, one area of the valve controls one inlet steam function and a different area of the valve controls an auxiliary exhaust function. The two areas control steam flow through separate inlet and auxiliary exhaust ports and passages. Thus, the flows of hot inlet steam and the relatively cooler exhaust steam are kept apart. A single slide valve can be used to control both inlet and auxiliary exhaust steam in a single-acting engine and also in a double-acting engine.

In the device herein described and disclosed, the simplicity of the slide-valve design is retained. The slide valve may be driven by valve gear giving the valve simple harmonic motion or an approximation to it. The valve gear, as in conventional steam engines, may be designed to give reverse operation plus changes in cut-off. A valve and drive system similar to that described herein is suitable for use in an engine without central "uniflow" exhaust ports which are uncovered by the piston near the ends of its stroke. In this case, the "auxiliary" exhausts described herein will be the main exhausts.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing summary is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

Accordingly, it is the object of this invention claimed herein to provide a steam engine having an improved slide valve and drive cylinder design wherein one area of the slide valve controls one inlet steam function and a different area of the valve controls an auxiliary exhaust function.

It is another object of this invention to supply the disclosed steam engine wherein two areas of the slide valve providing improved operation control steam flow through separate adjacently located inlet and auxiliary exhaust ports and passages.

It is another object of this invention to supply an improved steam engine providing a slide valve control of overall operation which is much simpler than alternative systems of controlling the extent and timing of opening of the auxiliary exhaust ports.

These and further objectives of this invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF PREFERRED EMBODIMENTS OF THE DISCLOSED DEVICE

Figure 1:
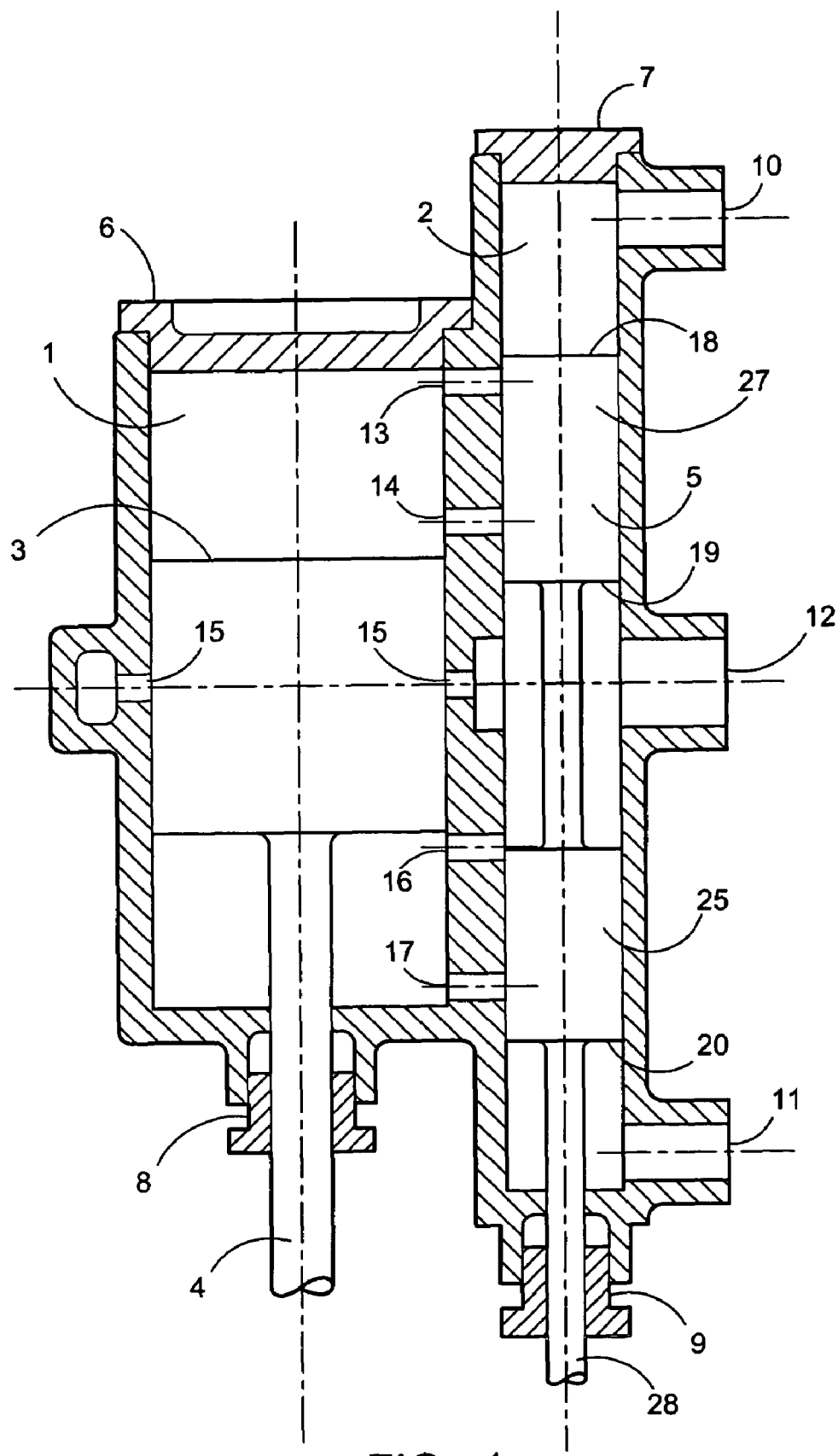
FIG. 1 shows a sectional view of the device featuring a cylinder arrangement for a Uniflow, double-acting type steam engine.

FIG. 1, shows the cylinder arrangement for an embodiment of the device for employment with a uniflow double-acting steam engine including the herein disclosed and described novel valve design, which used in conjunction with a conventional harmonic valve drive mechanism, forms the main part of this invention. Not shown is the crankcase containing the connecting rod, crosshead, valve motion and other attendant parts of the engine for which the disclosed device is adapted for engagement. These latter parts may be conventional in design.

The main parts shown are the cylinder 1, the valve chest 2, and the piston, 3, which would best be fitted with piston rings (not shown). Also shown in FIG. 1 is the piston rod 4, and the slide valve 5, showing the continuous exterior surface to contact the valve chest and which also would be fitted with sealing rings but which are not shown. Number 6 depicts the cylinder head and the valve chest cap is shown as number 7. The piston rod sealing assembly is identified by number 8 and number 9 represents the valve rod sealing assembly.

In the preferred arrangement of the disclosed device as shown, the valve chest 2 is adapted for outside admission. Two steam inlet ports are shown as numbers 10 and 11 and the exhaust port is shown as number 12. The cylinder upper inlet steam passage 13 is shown at the upper area of the cylinder adjacent to the cylinder upper auxiliary exhaust steam passage 14.

In a central section of the cylinder 1 is the cylinder uniflow or central exhaust steam ports 15. At a lower end of the cylinder 1, is the cylinder lower auxiliary exhaust steam passage 16 and the cylinder lower inlet steam passage 17. It should be noted that steam inlet passages 13 and 17 and steam exhaust ports 14 and 16, while depicted as single passages, may be one or a plurality of passages to provide the volume communication required. It should also be noted that use of the terms upper and lower are for convenience sake and those skilled in the art will realize that positioning and operation of such engines is possible using different manners of positioning of the components described herein. Therefore the invention herein described and disclosed is employable for steam engines of any position and angle of operation.

In the position shown in the drawing FIG. 1, the piston 3 is shown as it would be moving downwards toward the lower end of the cylinder 1 and the slide valve 5 would be concurrently rising in the opposite direction of the piston 3. The upper part of the slide valve 5 at the face 18 is moving away from the piston 3, and has just cut off the inlet steam supply though the upper steam inlet 13 to the upper portion of cylinder 1 and to the top of the piston 3 which continues to travel downwards under pressure from the expanding steam in the upper portion of the cylinder 1. The length of the continuous side edge of the upper piston 27 of the slide valve 5 and the speed of the slide valve 5 in reciprocal motion to the piston 3 during each engine cycle to determine the length of time it will maintain this cut off of steam so long as it covers the inlet 13. Steam under the piston 3 in the lower portion of the cylinder 1 is exhausting through lower exhaust passage 16 and out the exhaust port 12, until cut off by the piston 3 moving downward wherein the piston's continuous side edge covers the exhaust passage 16. At this point in the timing of the device, compression of the residual steam in the lower portion of the cylinder 1, under the piston 3 will then begin.

When the piston 3 reaches the bottom of its stroke, steam above the piston 3 in the upper portion of the cylinder 1, will exhaust through the main uniflow or central exhaust ports 15. The side of the upper piston 27 of the slide valve 5 bounded by the lower face 19 will uncover its sealed engagement over the auxiliary upper exhaust port 14 which will vent exhaust steam also thereby emptying the upper portion of cylinder 1 through two routes of exhaust increasing efficiency of this operation. It has been found through experimentation that the total aggregate area of each set of the exhaust ports 14, and 16, may be adjusted to provide a means for metered steam flow such that the flow is adequate to significantly reduce back pressure only at low speeds, while at higher speeds and larger throttle openings, the engine will operate more similarly to that of a full Uniflow engine. This can be done through adjusting the sizes of the exhaust ports so that the volume of exhaust vented at lower speeds of the engine being built for use at desired speeds and loads has the desired reduced back pressure at the determined low speeds.

The slide valve 5 will uncover the lower steam intake 17 and allow admission of steam past rising lower face 20 at the bottom of the second or lower piston 25 opposite the upper piston 27, and communicate it to the underside of the piston 3. The piston 3 will then begin to rise from the force of the steam. In reciprocal action, the slide valve 5 with the first or upper piston 27 and the second or lower piston 25 operatively engaged by the valve rod 28 at an operative distance, now begins to descend, and the lower end slide valve 5 bounded by face 20 of the lower piston 25 passes the lower inlet steam passages 17 wherein the continuous side edge of the lower piston 25 seals the lower inlet steam passage 17 and causes cut-off of the steam communicated to the lower end of the cylinder 1. The duration of the cut off is determined by the length of the side surface of the lower piston 25 in the same fashion of the sealing operation of the upper piston 27 combined with the speed of the valve rod 28. The piston 3 is now moving upwards from the force of the steam in the lower end of the cylinder 1, and the slide valve 5 is concurrently descending in the opposite direction. This reciprocal cycle now continues similarly to that described above but for an "up" power stroke of the piston 3, rather than for a "down" power stroke.

Figure 2A:
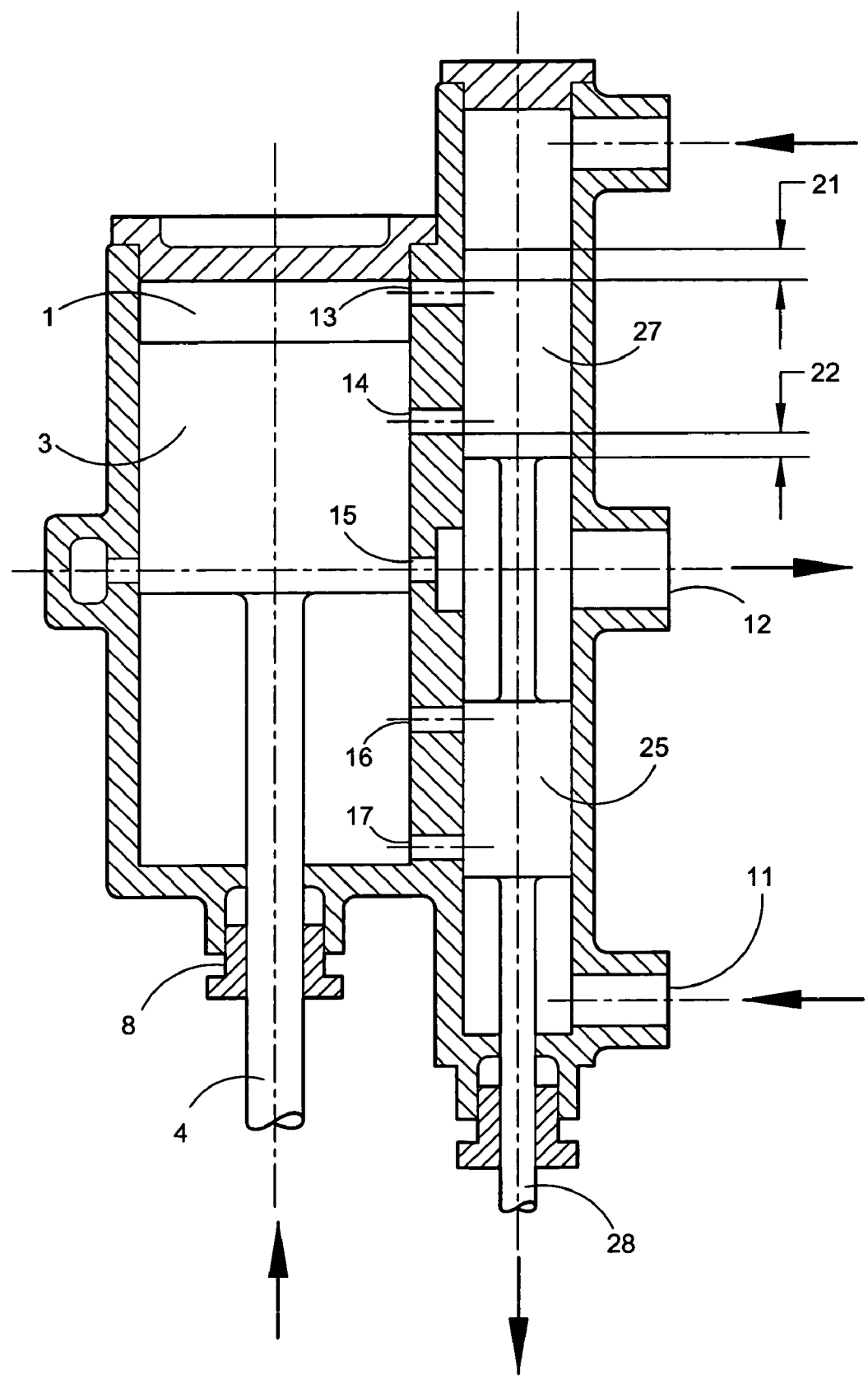
FIG. 2a depicts the new design showing the engine of FIG. 1, depicting the valve laps of the present device.
Figure 2B:
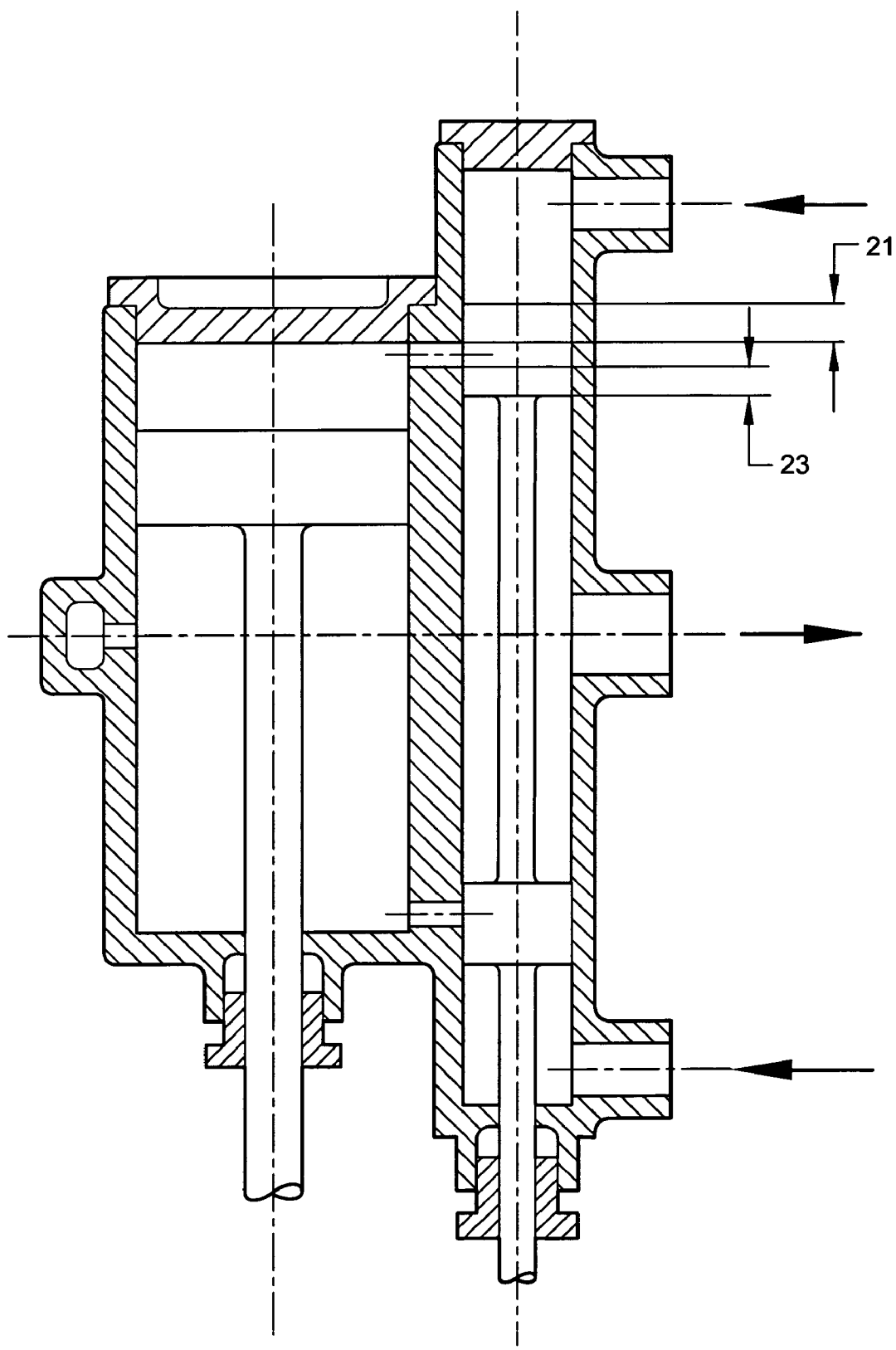
FIG. 2b depicts prior art in the form of a valve design for a conventional non-uniflow steam engine and the conventional admission lap and an exhaust lap thereof.

Drawings FIG. 2a and FIG. 2b illustrate the improvement of the disclosed device and operation over conventional valve design for the disclosed uniflow engine by employment of auxiliary exhausts 14 and 16, compared with valve design for a conventional engine with outside admission slide valves as shown in FIG. 2b. Also shown in FIG. 2a is the unique admission lap 21 and uniflow auxiliary exhaust lap 22 of the disclosed device which is provided by the length of the continuous side wall of the piston at the upper cylinder 27 and lower cylinder 25. The continuous sidewalls of both the upper and lower cylinders of the slide valve 5, cover both their adjoining respective inlet and exhaust ports during each cycle for a lap period determined by the length of each of the two cylinders of slide valve 5 which are operatively engaged by the valve rod 28 therebetween and thereby define the admission lap 21 and exhaust lap 22 shown in FIG. 2a.

FIG. 2b to the contrary shows the close proximity of the admission lap 21 and the conventional exhaust lap 23 in a non-uniflow steam engine and the short duration therebetween and limitations on adjustment. Employing the disclosed device, the full diameter part of each bobbin is extended so as to control exhaust steam flow separably through the auxiliary exhaust ports rather than through common admission and exhaust ports as in conventional designs. The disclosed design also does not require any special cams, chains, or valves in its connection of the slide valve 5 to the control system. The design may be carried out using conventional valve diagrams which incorporate specifications for eccentric radius and eccentric phase difference with the engine crank.

Although the invention has been herein disclosed and described with respect to particular embodiments thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and method of operation of the present invention, it is to be understood, however, that elements of different construction and configuration and other arrangements thereof, other than those illustrated and described, may be employed in accordance with the spirit of this invention. Any and all such changes, alternations and modifications, as would occur to those skilled in the art, are considered to be within the scope of this invention as broadly defined in the appended claims.

What is claimed is:

1. A steam engine or compressed air motor or compressed gas motor comprising:
    a piston adapted for reciprocation in cycles, inside a cylinder;
    said piston having a first end, and second end, and a piston sidewall communicating therebetween;
    said piston attached to a rod adapted for operative communication with a drive;
    said cylinder having a first end portion on one side of said piston and a second end portion on the opposite side of said piston;
    a first intake port communicating with said cylinder at said first end portion and a second intake port communicating with said cylinder at said second end portion;
    a first exhaust port communicating with said first end portion of said cylinder adjacent to said first intake port said first exhaust port having a determined size to exhaust steam therefrom at a first determined rate;
    a second exhaust port communicating with said second end portion of said cylinder adjacent to said second intake port said second exhaust port having a determined size to exhaust steam therefrom at a second determined rate;
    said first and said second determined rates thereby providing means to significantly reduce back pressure only at low speeds of said engine;
    a valve cylinder adjacent to said cylinder, said valve cylinder having steam inlet ports communicating therewith at first and second ends and also having an exhaust port communicating therewith at a center section;
    a slide valve slidably engaged in said valve cylinder;
    said slide valve having a first slide cylinder and a second slide cylinder engaged to said first slide cylinder a fixed distance therefrom defining a gap therebetween;
    said first slide cylinder having a top surface, a bottom surface, and a first sidewall surface communicating therebetween defining a first length;
    said second slide cylinder having a top surface, a bottom surface, and a second sidewall surface communicating therebetween defining a second length;
    said first intake port and said first exhaust port communicating with said valve cylinder at a first distance therebetween;
    said second respective intake and said second exhaust port communicating with said valve cylinder at a second distance therebetween;
    said slide valve translating in a reciprocal simple harmonic motion to said piston between said first and second ends of said valve cylinder during each cycle of operation of said steam engine;
    said first length defining an intake lap and exhaust lap in said first intake and first exhaust port; and
    said second length determining a second intake lap and exhaust lap in said second intake port and second exhaust port;
    and
    wherein steam is communicated to said first end portion and said second end portions of said cylinder through said first and second intake ports, and exhausted through respective separate said first and second exhaust ports of said cylinder during said cycle of operation, for total respective time durations of said first and second intake and exhaust laps determined by said slide valve moving in said harmonic motion.

2. The device as defined in claim 1 additionally comprising:
    a central exhaust port communicating between a center portion of said cylinder and said valve cylinder;
    said piston sidewall providing a sealed engagement over said central exhaust port during portions of each said cycle; and
    said central exhaust port providing a second means to exhaust steam from said cylinder during exhaust portions of each said cycle determined by a duration said piston sidewall disengages from said sealed engagement.

3. The device as defined in claim 2 additionally comprising:
    said first length being longer than said first distance;
    said second length being longer than said second distance;
    whereby said first intake port and said first exhaust port are concurrently sealed by said first sidewall surface for a duration of time during each cycle of said engine; and
    said second intake port and said second exhaust port are concurrently sealed by said second sidewall surface for a duration of time during each cycle of said engine.

4. The device as defined in claim 2 additionally comprising:
    said engine having a fixed duration of time of each said cycle of operation.

5. The device as defined in claim 2 additionally comprising:
    said engine having a variable duration of time of each said cycle of operation.

6. The device as defined in claim 1 additionally comprising:
    said first length being longer than said first distance;
    said second length being longer than said second distance;
    whereby said first intake port and said first exhaust port are concurrently sealed by said first sidewall surface for a duration of time during each said cycle of said engine; and
    said second intake port and said second exhaust port are concurrently sealed by said second sidewall surface for a duration of time during each said cycle of said engine.

7. The device as defined in claim 1 additionally comprising:
    said engine having a fixed duration of time of each said cycle of operation.

8. The device as defined in claim 1 additionally comprising:
    said engine having a variable duration of time of each said cycle of operation.

* * * * *